April 3, 1934.   J. G. ZUMMACH   1,953,794
HUMIDIFIER
Filed Sept. 22, 1932

Inventor
John G. Zummach
By Arthur R. Woolfolk
Attorney

Patented Apr. 3, 1934

1,953,794

UNITED STATES PATENT OFFICE 1,953,794

HUMIDIFIER

John G. Zummach, Milwaukee, Wis.

Application September 22, 1932, Serial No. 634,306

10 Claims. (Cl. 219—39)

This invention relates to humidifiers.

Objects of this invention are to provide a novel form of humidifier which is so made that an electrical heating element heats only a small portion of the water at a time and in which this small portion of heated water is thermally insulated from the body of the water so that the temperature of the main body of the water is not raised, although the small insulated body of water heated by the electric unit is actually boiled.

Further objects are to provide a humidifier which is provided with a buoyant member formed of a small floating reservoir or chamber in which the air space forming the buoyant portion of the device also constitutes the thermal insulating means to prevent conduction of heat to the surrounding body of water, and which is also provided with a fan to insure an adequate circulation of air through renewable filtering means to remove particles of dust, the rapid circulation produced by the fan being provided so that the air is not heavily charged with readily condensed vapor, but in which instead the air is moderately charged and is rapidly circulated, the vaporization being thorough and complete and the air discharged from the humidifier being in such a condition that there is no possible chance of moisture forming on surrounding or nearby objects.

Further objects are to provide a humidifier in which a guided float is provided with an electric heating unit and is guided by a removable stem or pipe which is supported from the base and through which the electric cable or conducting wires pass to a fan motor carried by the pipe or stem and to the electric heating unit, the heating unit being thus freely and positively guided and prevented from tipping or moving out of position laterally during the operation of the device, an automatic cutoff switch and an automatic associated mechanism being provided to cut off the supply of current to the motor and to the heating unit whenever the water in the main reservoir is nearing exhaustion.

Further objects are to provide a construction in which the motor, the float provided with an electric heating unit, and the associated parts may be assembled at the bench and thereafter installed in the main reservoir as a unit, providing for easy removal for adjustment and repair and greatly simplifying the constructional details of the device, while at the same time the pipe or stem forms not only a support for the motor and guide for the float, but also forms a protecting housing for the electric cable, preventing such cable from becoming wet or short-circuited by the water in the device, and additionally providing a construction in which the incoming electric cable passes outwardly from beneath the device, thus avoiding the unsightly appearance of a cable which would have to be looped from the upper end of the device and thereafter downwardly.

An embodiment of the invention is shown in the accompanying drawing, in which.

Figure 1:
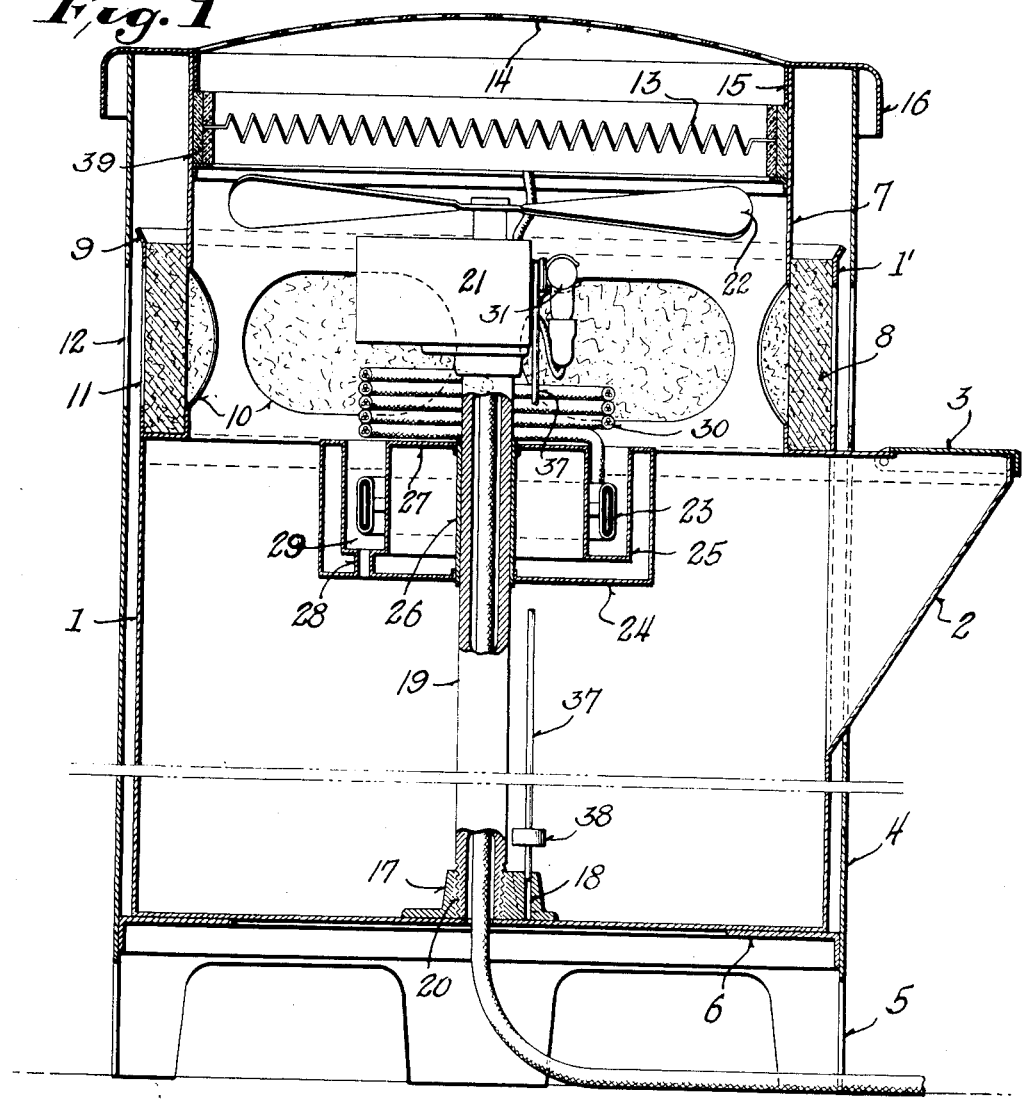
Figure 1 is a vertical sectional view through the device, such view being transversely broken and shortened up.

Referring to the drawing, it will be seen that the humidifier comprises a main reservoir 1 which is provided with a filling spout 2 equipped with a hinged cover 3. The spout may project from any desired point in the device. This reservoir is mounted within a surrounding casing 4 which may be hexagonal, round, or of any other shape desired to give the necessary ornamental appearance to the device.

This outer casing 4 extends downwardly and is provided with integral legs 5. Preferably a supporting annular flange 6 is carried within the casing and to which the reservoir 1 is secured.

A smaller internally located casing 7 is provided adjacent the upper portion of the device and is spaced inwardly from the outline of the walls of the main reservoir 1, so that such walls, continued upwardly and indicated at 1' in Figure 1, form an annular space adapted to receive air filtering filling or packing 8. This packing is in the form of an annular wick which is easily slid into place from the top of the device. Preferably the upper edge of the extension 1' of the reservoir walls is turned outwardly to form the beveled lip 9 to facilitate insertion of the filtering filling or wick 8. At regular intervals, cutouts 10 and 11 are formed in a casing 7 and in the extension 1' of the reservoir wall. It is also preferable to provide cutouts 12 in the wall of the outer casing 4. These cutouts 12 may or may not be in alignment with the cutouts 10 and 11.

If desired, an electric air heater indicated at 13 may be carried within the top portion of the inner casing 7 and may or may not be used as needed, suitable switching means, not shown, being provided exteriorly of the device. The purpose of this heating member 13 is to heat the air, if it is so desired. The heating member 13 may be of any conventional form, for instance, a series of coils of heating wire may extend across the device.

The entire apparatus is closed by a removable cover 14 which is preferably bowed upwardly in its central portion and is formed in the manner of an ornamental grating to permit free exit of the air that is drawn inwardly through the openings 12, 11 and 10, and which has the proper quantity of moisture imparted thereto in a manner hereinafter to appear. The cover 14 may be provided with a positioning annular flange 15 which slides within the inner casing 7. It is provided with an overhanging marginal flange 16 to give a finished appearance to the device.

A fitting 17 is secured to the central bottom portion of the reservoir 1 and is internally threaded, as indicated at Figure 1, and is provided with a hole 18 spaced laterally from the threaded aperture.

A supporting stem or pipe 19 has a threaded lower portion indicated at 20 in Figure 1 which is screwed into the fitting 17. This pipe supports an electric fan motor 21 at its upper end. A small fan 22 is driven by the electric motor and located above such motor.

The stem or pipe 19 also forms a guide for a float which carries the electric heating unit 23. This float is formed of an outer wall 24 and an inner annularly shaped wall 25 spaced therefrom. It is provided with a central tube 26 which joins the inwardly extending flange 27 of the annular wall 25 and also which joins the bottom portion of the outer wall 24 in a water-tight manner. This provides a buoyant space between the walls so that a light float is provided. The tubular portion 26 freely slides upwardly and downwardly upon the pipe or supporting standard or stem 19, as is obvious from an inspection of Figure 1.

The float is provided with a small pipe or tube 28 which provides an opening from the annular space 29 to the bottom of the float, so that water may freely run upwardly through the pipe 28 into the annular space 29 and around the heating unit 23. The float when the annular space 29 is filled with water, is buoyant and stays in approximately the same relation to the water level within the main reservoir 1 at all times, irrespective of the extent of depletion of the water level within the main reservoir 1, the float moving down as the water is used up. However, it is to be noted particularly that the water within the annular space 29 may be and preferably is actually boiled by the heating unit 23, although it is thermally insulated by the surrounding air space from the main body of water within the reservoir so that the heating unit is required to heat only a very small portion of water at a time, this water being automatically renewed through the pipe 28 and the float adjusting itself to the water level within the main reservoir 1 in a wholly automatic manner.

The heating unit 23 is supplied through a coil, spring-like cable 30 which is formed in the manner of a helix, as shown in Figure 1, and freely extends or contracts as the float moves upwardly or downwardly.

A snap action limit switch is provided for the device and is operated by the float, so that when the float moves downwardly to its lowest position, it opens the switch and cuts off the supply of current, thereby stopping the operation of the device and preventing burning out of the heating element.

Figure 2:
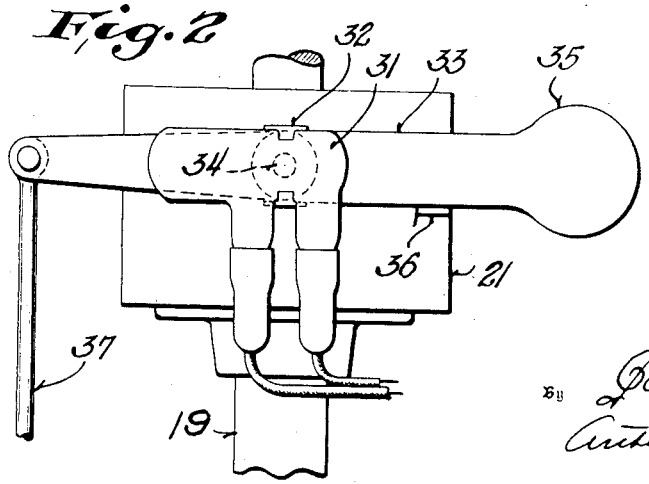
Figure 2 is an enlarged side elevation of the mercury trip switch.

This limit switch may take the form of a mercury switch, indicated at 31 in Figure 2, and mounted in any suitable manner as by means of the spring clips 32 upon a lever 33 pivotally mounted, as indicated at 34, to the side of the motor 21.

This lever is provided with a weight 35 to automatically close the switch, a suitable stop 36 being carried by the motor casing, as indicated at Figure 2. The switch is operated by means of a rod 37 which extends downwardly through the float and has its lower end guided within the opening 18 in the fitting 17, see Figure 1. At a suitable point adjacent the lower end of the rod a stop collar 38 is provided which is engaged by the float in its lowest position and thereby moves the switch to open position.

Figure 3:
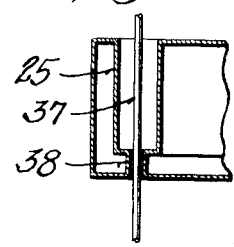
Figure 3 is a sectional detail through the device showing where the cutoff rod passes through the float.

The rod 37 freely passes through the float, as indicated in Figure 3. The float is provided with a tube or sleeve 38 which is joined to the inner annular portion 25 and to the bottom portion of the float so as to form a watertight joint.

In the operation of the apparatus, water is poured into the reservoir 1 through the filling spout 2, the filling spout being so located that the water level cannot be raised above a predetermined point about as indicated in Figure 1. The float rises as water is poured into the device and when the current is turned on, by means of an external switch, not shown, the heating element constantly boils or vaporizes the water in the annular compartment 29 and this vaporized water is picked up by the stream of air sucked in through the filtering padding or filling 8 and blown upwardly by means of the fan 22. As the water is used up in the main reservoir 1, the float settles down to adjust itself to the lowered water level. This operation continues until the limit switch functions and the electric circuit is thus opened.

It is to be noted that the filtering filling or packing 8 may be readily removed by removing the top and slipping it upwardly around the inner casing 7. Further, it is apparent that there is no chance of short-circuiting any portion of the electrical equipment as the water is poured in from the side of the device and cannot cause any damage to such electrical equipment.

An additional feature which is highly important in the practical application of this invention is that the entire operative mechanism is carried as a unit by the hollow stem or standard 19, and if it is desired to repair the device, this stem or standard may be readily removed from its support or fitting 17 and the entire operative device inspected or repaired.

If an air heating unit 13 is employed, it is preferable to form its annular support 39 so that it may be removed from the upper portion of the device, so as to permit free removal of the operative mechanism. However, in many instances no air heating unit 13 is employed.

It will be seen that a novel form of humidifier has been provided in which there is a guided float equipped with an electric heating element for vaporizing an isolated or thermally insulated small body of water, and that this float is free to adjust itself to the decreasing water level in the main reservoir.

It will be seen also that the entire device is simple and is formed in a highly practical and easily produced manner.

Although this invention has been described in considerable detail, it is to be understood that such description is intended as illustrative rather than limiting, as the invention may be variously embodied and is to be interpreted as claimed.

I claim:

1. A humidifier comprising a reservoir, a standard mounted within said reservoir, a float slidably mounted upon said standard and having a water compartment opening through the body of the float, an electric heating element carried by said float and positioned within the water compartment of the float for vaporizing the water within the float, a rod movably supported by said reservoir and having means against which said float strikes when in its lowest position, and a limit switch operated by said rod and controlling said electric heating element, said limit switch being located at a point remote from the upper end of the reservoir.

2. A humidifier comprising a main reservoir adapted to contain a liquid, a standard supported from the bottom of said main reservoir, a float slidably guided by said standard, said float having a hollow air chamber and having a small liquid receiving compartment thermally insulated from the main body of the liquid within the main reservoir, and an electric heater carried by said float for heating the liquid within said compartment, said float having an opening providing an inlet passage for the liquid from the main reservoir into the compartment of said float.

3. A humidifier comprising a main reservoir adapted to contain a liquid, a hollow standard supported within said reservoir, a float slidably mounted upon said standard and having a liquid receiving thermally insulated compartment, said float having an inlet passageway for the liquid from said main reservoir to said compartment, an electric heating element carried by said float for vaporizing the liquid within the compartment of said float, and an electric cable extending upwardly through said hollow standard and connected to said heating element.

4. A humidifier comprising a main reservoir adapted to contain a liquid, a hollow standard supported within said reservoir, a float slidably mounted upon said standard and having a liquid receiving thermally insulated compartment, said float having an inlet passageway for the liquid from said main reservoir to said compartment, an electric heating element carried by said float for vaporizing the liquid within the compartment of said float, and an electric cable extending upwardly through said hollow standard and connected to said heating element by a helically coiled conductor.

5. A humidifier comprising a main reservoir adapted to contain a liquid, a standard projecting upwardly within said reservoir, a float slidably guided by said standard and provided with an annular liquid receiving open top compartment, said float having an air space surrounding said annular compartment for thermally insulating said compartment from the main body of liquid within said main reservoir and for providing buoyancy to said float, said float having a small tube opening through its bottom and into the compartment of said float, and an electric heating element mounted within the annular compartment of said float.

6. A humidifier comprising a main reservoir, a standard projecting upwardly within said reservoir, a float slidably carried by said standard, said float having a liquid receiving compartment replenishable from said main reservoir and thermally insulated from the liquid within said main reservoir, and a limit switch supported from said standard and operated by said float when said float arrives at its lowest position.

7. A humidifier comprising a main reservoir adapted to contain a liquid, a standard extending upwardly from the bottom of said reservoir, a float slidably mounted upon said standard and provided with a liquid receiving compartment thermally separated from the main body of liquid within said reservoir and replenished therefrom, an electric heating unit mounted within the compartment of said float, an electric motor carried by the upper end of said standard, a fan driven by said electric motor, and a limit switch operated by said float when said float approaches its lowest position.

8. A humidifier comprising a main reservoir adapted to contain a liquid, a standard extending upwardly from the bottom of said reservoir, a float slidably mounted upon said standard and provided with a liquid receiving compartment thermally separated from the main body of liquid within said reservoir and replenished therefrom, an electric heating unit mounted within the compartment of said float, an electric motor carried by the upper end of said standard, a fan driven by said electric motor, a limit switch operated by said float when said float approaches its lowest position, and an electric cable extending upwardly through said standard for supplying said electric motor and said heating unit.

9. A humidifier comprising a main reservoir adapted to contain a liquid, a standard mounted within said reservoir, a float slidably carried by said standard and having a liquid receiving compartment replenished from said main reservoir, a heating unit mounted within said compartment, an electric motor carried by the upper end of said standard, a fan driven by said electric motor, an inner casing spaced inwardly from the upper portion of the walls of said main reservoir, the adjacent portion of said inner casing and the upper portion of the walls of said main reservoir having apertures therethrough, and an air filtering packing positioned between the upper portion of the walls of said reservoir and said inner casing.

10. A humidifier comprising a main reservoir adapted to contain a liquid, a hollow standard removably supported from the lower portion of said reservoir, and projecting upwardly within said reservoir, a float slidably mounted upon said standard and provided with a liquid receiving compartment supplied from said main reservoir, an electric heating unit within said compartment, an electric motor carried by the upper end of said standard, a fan driven by said electric motor, a limit switch mounted upon said electric motor and operated by said float, and an electric cable for supplying said motor and said heating unit, said electric cable passing upwardly through said hollow standard.

JOHN G. ZUMMACH.